US012647854B2

(12) United States Patent
Sun et al.

(10) Patent No.: US 12,647,854 B2
(45) Date of Patent: Jun. 2, 2026

(54) HANDOVER CONTROL METHOD, ADMISSION CONTROL METHOD, AND COMMUNICATION APPARATUS

(71) Applicant: HUAWEI TECHNOLOGIES CO., LTD., Shenzhen (CN)

(72) Inventors: Fei Sun, Shanghai (CN); Haiyan Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 18/221,105

(22) Filed: Jul. 12, 2023

(65) Prior Publication Data

US 2023/0354119 A1 Nov. 2, 2023

Related U.S. Application Data

(63) Continuation of application No. PCT/CN2021/071794, filed on Jan. 14, 2021.

(51) Int. Cl.
*H04W 36/00* (2009.01)
*H04W 36/26* (2009.01)
(Continued)

(52) U.S. Cl.
CPC ....... *H04W 36/0077* (2013.01); *H04W 36/26* (2013.01); *H04W 48/14* (2013.01); *H04W 48/18* (2013.01)

(58) Field of Classification Search
CPC . H04W 36/0077; H04W 36/26; H04W 48/14; H04W 48/18; H04W 36/0064; H04W 36/00838; H04W 36/13
(Continued)

(56) References Cited

U.S. PATENT DOCUMENTS

2018/0124661 A1* 5/2018 Tsai ..................... H04W 24/10

FOREIGN PATENT DOCUMENTS

CN 108024253 A 5/2018
CN 108024297 A 5/2018
(Continued)

OTHER PUBLICATIONS

Vivo, "Consideration on RAN Slicing", 3GPP TSG-RAN WG2 Meeting #111 e R2-2007302,Aug. 28, 2020,total 4 pages.
(Continued)

*Primary Examiner* — Huy C Ho
(74) *Attorney, Agent, or Firm* — WOMBLE BOND DICKINSON (US) LLP

(57) ABSTRACT

This application provides a handover control method, an admission control method, and a communication apparatus. A first access network device obtains mapping information between an access network slice instance of a second access network device and a network slice; the first access network device determines, based on the mapping information, that the second access network device supports a first network slice associated with a service currently performed by a terminal device; and the first access network device sends first request information to the second access network device, where the first request information is used to request to enable the terminal device to access the second access network device, and then the second access network device performs admission control. In this technical solution, continuity of a network slice service can be ensured when the terminal device performs handover between access network devices, and impact on a core network can be reduced.

20 Claims, 7 Drawing Sheets

(51) Int. Cl.
    *H04W 48/14*         (2009.01)
    *H04W 48/18*         (2009.01)

(58) Field of Classification Search
    USPC ......................................................... 370/331
    See application file for complete search history.

(56) References Cited

FOREIGN PATENT DOCUMENTS

| | | |
|---|---|---|
| CN | 111918346 A | 11/2020 |
| EP | 3596969 A1 | 1/2020 |
| WO | 2018137637 A1 | 8/2018 |
| WO | 2018171904 A1 | 9/2018 |

OTHER PUBLICATIONS

ZTE, "NW Slice Availability Handling Approaches during Mobility", 3GPP TSG RAN WG3 Meeting #95bis R3-171029,Apr. 7, 2017,total 6 pages.

ZTE, "Selection RAN Part Network Slice during UE mobility", 3GPP TSG RAN WG3 NR-adhoc R3-170065,Jan. 19, 2017,total 7 pages.

3GPP TS 28.541 V17.1.0:"3rd Generation Partnership Project; Technical Specification Group Services and System Aspects; Management and orchestration; 5G Network Resource Model (NRM); Stage 2 and stage 3 (Release 17 )",Dec. 2020,total 456 pages.

\* cited by examiner

HANDOVER CONTROL METHOD, ADMISSION CONTROL METHOD, AND COMMUNICATION APPARATUS

CROSS-REFERENCE TO RELATED APPLICATIONS

This application is a continuation of International Application No. PCT/CN2021/071794, filed on Jan. 14, 2021, the disclosure of which is hereby incorporated by reference in its entirety.

TECHNICAL FIELD

This application relates to the communication field, and in particular, to a handover control method, an admission control method, and a communication apparatus.

BACKGROUND

With development of mobile communication technologies, various new services and application scenarios continuously emerge, and requirements of these services for network functions, connection performance, security, and the like differ greatly. If a single network is used to carry these services, it is difficult to meet requirements for high bandwidth, low latency, high reliability, and the like at the same time. However, building a new network for each type of service brings huge costs. This requires a communication system to be flexible and scalable, and to meet different service requirements.

In this background, an end-to-end network slice (also referring to as network slicing) is proposed in a 5th generation (5G) communication system, to provide a user with a customized network service. Through flexible allocation of network resources and on-demand networking, a plurality of logical subnets having different features and isolated from each other may be virtualized on a same set of physical infrastructures, to provide the user with a targeted service.

However, in some cases, for example, when quality of a channel between a terminal device and a source access network device deteriorates due to movement of the terminal device, the terminal device needs to be handed over to a target access network device with better channel quality. However, when the target access network device does not support a network slice associated with a service currently performed by the terminal device or resources are insufficient, a slice service of the terminal device may be interrupted.

SUMMARY

This application provides a handover control method, an admission control method, and a communication apparatus, to ensure continuity of a network slice service when a terminal device performs handover between access network devices, and reduce impact on a core network.

According to a first aspect, a handover control method is provided. A first access network device obtains mapping information between an access network slice instance of a second access network device and a network slice; the first access network device determines, based on the mapping information, that the second access network device supports a first network slice associated with a service currently performed by a terminal device; and the first access network device sends first request information to the second access network device, and the first request information is used to request to enable the terminal device to access the second access network device.

According to an embodiment of this application, the first access network device obtains the mapping information between the access network slice instance and the network slice, and determines, based on the mapping information, that the second access network device supports the first network slice associated with the service currently performed by the terminal device. In this case, the first access network device sends a request message to the second access network device, to request to enable the terminal device to access the second access network device.

In this technical solution, handover control may be performed, based on whether the access network device supports the network slice, on the access network device accessed by the terminal device, so that continuity of the network slice service can be ensured when the terminal device performs handover, and impact on a core network can be reduced.

In an embodiment, the first access network device determines, based on the mapping information, that the second access network device includes a first access network slice instance corresponding to the first network slice; and the first access network device determines that the second access network device supports the first network slice.

According to an embodiment of this application, it may be determined, based on the mapping information, whether the second access network device includes an access network slice instance corresponding to the first network slice, so that it may be determined whether the second access network device supports the first network slice. This technical solution helps the first access network device make a handover decision.

In an embodiment, before the first access network device sends the first request information to the second access network device, the first access network device obtains load information of the access network slice instance of the second access network device; and the first access network device determines, based on the load information, that the first access network slice instance corresponding to the first network slice meets a service requirement of the first network slice.

According to an embodiment of this application, the first access network device may determine, based on the load information, whether the first access network slice instance corresponding to the first network slice meets the service requirement of the first network slice, to help the first access network device to make a handover decision.

In an embodiment, the mapping information further includes a preemption priority of the network slice for the access network slice instance, and the first access network device determines that a preemption priority of the first network slice for the first access network slice instance of the second access network device is greater than a first preset value; and the first access network device determines that the second access network device supports the first network slice.

The first preset value may be a preemption priority of load of the first access network slice instance, or may be a specified fixed value. This is not limited in this embodiment of this application.

The first preset value may alternatively be load of the first access network slice instance. The preemption priority of the first network slice for the first access network slice instance and the load of the first access network slice instance may be different dimensions. For ease of comparison, the two may be normalized or converted into a same dimension by using a specific function. The specific function is not limited in this embodiment of this application.

According to an embodiment of this application, when determining that the preemption priority of the first network slice for the first access network slice instance of the second access network device is greater than the first preset value, the first access network device may determine that the second access network device supports the first network slice.

In an embodiment, the mapping information further includes a preemption priority of the network slice for the access network slice instance, a preemption priority of the first network slice for the first access network slice instance of the second access network device is less than or equal to a first preset value, and the first access network device determines that the second access network device includes a second access network slice instance corresponding to the first network slice, and a preemption priority of the first network slice for the second access network slice instance is greater than a second preset value; and the first access network device determines that the second access network device supports the first network slice.

The first preset value may be a preemption priority of load of the second access network slice instance, or may be a specified fixed value. This is not limited in this embodiment of this application.

The first preset value may alternatively be load of the second access network slice instance. The preemption priority of the first network slice for the second access network slice instance and the load of the second access network slice instance may be different dimensions. For ease of comparison, the two may be normalized or converted into a same dimension by using a specific function. The specific function is not limited in this embodiment of this application.

According to an embodiment of this application, when the preemption priority of the first network slice for the first access network slice instance is less than or equal to the first preset value, but the preemption priority for the second access network slice instance is greater than the second preset value, it may be determined that the second access network device supports the first network slice. This helps the first access network device make a handover decision.

In an embodiment, the first access network device obtains the mapping information through a system interface.

For example, the system interface may be an Xn interface between access network devices.

It should be understood that the mapping information may be obtained before the terminal device accesses the first access network device. For example, after the access network device is put into use, the access network devices may exchange information thereof through the Xn interface.

Alternatively, the mapping information may be obtained after the terminal device accesses the first access network device and before the handover decision is made.

In an embodiment, the first access network device sends a second request message to the second access network device, where the second request message is used to request to obtain the mapping information; and receives the mapping information sent by the second access network device.

In an embodiment, the mapping information is preconfigured in the second access network device.

In an embodiment, the mapping information is preconfigured in the first access network device.

According to a second aspect, an admission control method is provided. A second access network device receives a first request message, the first request information is used to request to enable a terminal device to access the second access network device, and the first request message includes an identifier of a first network slice associated with a service currently performed by the terminal device; the second access network device determines, based on mapping information between an access network slice instance and a network slice, whether to support the first network slice; and if the second access network device determines to support the first network slice, the second access network device determines, based on load information of a first access network slice instance corresponding to the first network slice, whether to allow access of the terminal device.

According to an embodiment of this application, when receiving a request message of the first access network device, the second access network device determines, based on the mapping information between the access network slice instance of the second access network device and the network slice, whether to support the first network slice associated with the service currently performed by the terminal device, and determines, based on the load information of the access network slice instance, whether to allow the access of the terminal device.

In an embodiment, the second access network device determines, based on the load information of the first access network slice instance, that load of the first access network slice instance meets a service requirement of the first network slice; and the second access network device allows the access of the terminal device.

According to an embodiment of this application, when load of the access network slice instance can meet the service requirement of the first network slice, the access of the terminal device is allowed, so that a slice service of the terminal device can be continuous and not interrupted, to improve user experience.

In an embodiment, the second access network device determines, based on the load information of the first access network slice instance, that load of the first access network slice instance does not meet a service requirement of the first network slice; and the second access network device rejects the access of the terminal device.

According to an embodiment of this application, when load of the access network slice instance cannot meet the service requirement of the first network slice, the access of the terminal device is rejected, to avoid interruption of a slice service of the terminal device.

In an embodiment, in determining whether to allow the access of the terminal device, the second access network device determines, based on the load information of the first access network slice instance, that a preemption priority of the first network slice for the first access network slice instance is greater than a third preset value; and the second access network device allows the access of the terminal device.

The third preset value may be a fixed value, or may be a preemption priority of current load of the first access network slice instance.

The third preset value may alternatively be load of the first access network slice instance. The preemption priority of the first network slice for the first access network slice instance and the load of the first access network slice instance may be different dimensions. For ease of comparison, the two may be normalized or converted into a same dimension by using a specific function. The specific function is not limited in this embodiment of this application.

According to an embodiment of this application, if the preemption priority of the first network slice for the first access network slice instance is greater than the third preset value, the access of the terminal device is allowed, so that it can be ensured that a current slice service of the terminal device is preferentially processed, to avoid interruption of the slice service of the terminal device.

In an embodiment, in determining whether to allow the access of the terminal device, the second access network device determines, based on the load information of the first access network slice instance, that a preemption priority of the first network slice for the first access network slice instance is less than or equal to a third preset value; and the second access network device rejects the access of the terminal device.

In an embodiment, a preemption priority of the first network slice for the first access network slice instance is less than or equal to a third preset value, and if a second access network slice instance corresponds to the first network slice, the second access network device may determine, based on load information of the second access network slice instance, that a preemption priority of the first network slice for the second access network slice instance is greater than a fourth preset value; and the second access network device allows the access of the terminal device.

The fourth preset value may be a fixed value, or may be a preemption priority of current load of the second access network slice instance.

The fourth preset value may alternatively be load of the second access network slice instance. The preemption priority of the first network slice for the second access network slice instance and the load of the second access network slice instance may be different dimensions. For ease of comparison, the two may be normalized or converted into a same dimension by using a specific function. The specific function is not limited in this embodiment of this application.

In an embodiment, if the second access network device determines, based on the mapping information, not to support the first network slice, the second access network device rejects the access of the terminal device.

In an embodiment, the mapping information between the access network slice instance and the network slice is preconfigured in the second access network device.

According to a third aspect, an admission control method is provided. An access network device receives a third request message of a terminal device, where the third request message is used by the terminal device to request to access the access network device, and the third request message includes an identifier of a target network slice accessed by the terminal device; the access network device determines, based on mapping information between an access network slice instance and a network slice, a target access network slice instance corresponding to the target network slice; and the access network device determines, based on load information of the target access network slice instance, whether to allow access of the terminal device.

According to an embodiment of this application, the terminal device carries identification information of the target network slice in an access request message, and the access network device may determine, based on the mapping information between the access network slice instance and the network slice, the access network slice instance corresponding to the target network slice, and determine, based on the load information of the access network slice instance, whether to allow the access of the terminal device. This technical solution can improve admission control efficiency.

In an embodiment, in determining the target access network slice instance corresponding to the target network slice, a distributed unit receives the mapping information that is between the access network slice instance and the network slice and that is sent by a central unit; and the distributed unit determines, based on the mapping information between the access network slice instance and the network slice, the target access network slice instance corresponding to the target network slice.

In this technical solution, the distributed unit may perform admission control on the terminal device based on the mapping information.

In an embodiment, the distributed unit receives a fourth request message sent by the central unit, the fourth request message is used to request to set up a context of the terminal device, and the fourth request message includes the identifier of the target network slice corresponding to a data radio bearer; and the distributed unit maps, based on the mapping information between the access network slice instance and the network slice, the data radio bearer to the target access network slice instance corresponding to the target network slice.

In an embodiment, the distributed unit sends the load information of the target access network slice instance to the central unit.

According to an embodiment of this application, the central unit may adjust a network slice bearer resource based on the load information. This technical solution can improve quality of service and efficiency of the network slice.

In an embodiment, the mapping information between the access network slice instance and the network slice is preconfigured in the central unit.

According to a fourth aspect, a communication apparatus is provided. An apparatus includes: an obtaining unit, configured to obtain mapping information between an access network slice instance of a second access network device and a network slice; a processing unit, configured to determine, based on the mapping information, that the second access network device supports a first network slice associated with a service currently performed by a terminal device; and a sending unit, configured to send first request information to the second access network device, where the first request information is used to request to enable the terminal device to access the second access network device.

In an embodiment, the processing unit is configured to: when determining, based on the mapping information, that the second access network device includes a first access network slice instance corresponding to the first network slice, determine that the second access network device supports the first network slice.

In an embodiment, the obtaining unit is further configured to obtain load information of the access network slice instance of the second access network device; and the processing unit is further configured to determine, based on the load information, that the first access network slice instance corresponding to the first network slice meets a service requirement of the first network slice.

In an embodiment, the mapping information further includes a preemption priority of the network slice for the access network slice instance, and the processing unit is configured to: when determining that a preemption priority of the first network slice for the first access network slice instance of the second access network device is greater than a first preset value, determine that the second access network device supports the first network slice.

In an embodiment, the mapping information further includes a preemption priority of the network slice for the access network slice instance, a preemption priority of the first network slice for the first access network slice instance of the second access network device is less than or equal to a first preset value, and the processing unit is configured to: when determining that the second access network device includes a second access network slice instance corresponding to the first network slice, and a preemption priority of the first network slice for the second access network slice instance is greater than a second preset value, determine that the second access network device supports the first network slice.

In an embodiment, the obtaining unit is configured to obtain the mapping information through a system interface.

In an embodiment, the obtaining unit is configured to: send a second request message to the second access network device, where the second request message is used to request to obtain the mapping information; and receive the mapping information sent by the second access network device.

In an embodiment, the mapping information is preconfigured in the second access network device.

According to a fifth aspect, a communication apparatus is provided. A communication apparatus includes a receiving unit, configured to receive a first request message, where the first request information is used to request to enable a terminal device to access a second access network device, and the first request message includes an identifier of a first network slice associated with a service currently performed by the terminal device; and a processing unit, configured to determine, based on mapping information between an access network slice instance and a network slice, whether to support the first network slice; and the processing unit is further configured to: if the processing unit determines to support the first network slice, determine, based on load information of a first access network slice instance corresponding to the first network slice, whether to allow access of the terminal device.

In an embodiment, the processing unit is configured to: determine, based on the load information of the first access network slice instance, that load of the first access network slice instance meets a service requirement of the first network slice; and allow the access of the terminal device.

In an embodiment, the processing unit is configured to: determine, based on the load information of the first access network slice instance, that load of the first access network slice instance does not meet a service requirement of the first network slice; and reject the access of the terminal device.

In an embodiment, the processing unit is configured to: determine, based on the load information of the first access network slice instance, that a preemption priority of the first network slice for the first access network slice instance is greater than a third preset value; and allow the access of the terminal device.

In an embodiment, the processing unit is configured to: determine, based on the load information of the first access network slice instance, that a preemption priority of the first network slice for the first access network slice instance is less than or equal to a third preset value; and reject the access of the terminal device.

In an embodiment, the processing unit is further configured to: if the processing unit determines, based on the mapping information, not to support the first network slice, reject the access of the terminal device.

In an embodiment, the mapping information between the access network slice instance and the network slice is preconfigured in the second access network device.

According to a sixth aspect, a communication apparatus is provided. A communication apparatus includes a receiving unit, configured to receive a third request message of a terminal device, where the third request message is used by the terminal device to request to access the access network device, and the third request message includes an identifier of a target network slice accessed by the terminal device; and a processing unit, configured to determine, based on mapping information between an access network slice instance and a network slice, a target access network slice instance corresponding to the target network slice. The processing unit is further configured to determine, based on load information of the target access network slice instance, whether to allow access of the terminal device.

According to a seventh aspect, a communication apparatus is provided, including: a processor, a memory, and a transceiver. The memory is configured to store a computer program. The processor is configured to: invoke and run the computer program stored in the memory, and control the transceiver to receive/send a signal, so that the communication apparatus performs the method in any one of the first aspect or the possible implementations of the first aspect.

According to an eighth aspect, a communication apparatus is provided, including: a processor, a memory, and a transceiver. The memory is configured to store a computer program. The processor is configured to: invoke and run the computer program stored in the memory, and control the transceiver to receive/send a signal, so that the communication apparatus performs the method in any one of the second aspect or the possible implementations of the second aspect.

According to a ninth aspect, a communication apparatus is provided, including: a processor, a memory, and a transceiver. The memory is configured to store a computer program. The processor is configured to: invoke and run the computer program stored in the memory, and control the transceiver to receive/send a signal, so that the communication apparatus performs the method in any one of the third aspect or the possible implementations of the third aspect.

According to a tenth aspect, a computer-readable storage medium is provided. The computer-readable storage medium stores computer instructions. When the computer instructions are run on a computer, the method in any one of the first aspect or the possible implementations of the first aspect is performed, the method in any one of the second aspect or the possible implementations of the second aspect is performed, or the method in any one of the third aspect or the possible implementations of the third aspect is performed.

According to an eleventh aspect, a computer program product is provided. The computer program product includes computer program code. When the computer program code is run on a computer, the method in any one of the first aspect or the possible implementations of the first aspect is performed, or the method in any one of the second aspect or the possible implementations of the second aspect is performed, or the method in any one of the third aspect or the possible implementations of the third aspect is performed.

According to a twelfth aspect, a chip is provided, including a processor and a communication interface. The communication interface is configured to receive a signal and transmit the signal to the processor, and the processor processes the signal, so that the method in any one of the first aspect or the possible implementations of the first aspect is performed, the method in any one of the second aspect or the possible implementations of the second aspect is performed, or the method in any one of the second aspect or the possible implementations of the second aspect is performed.

DESCRIPTION OF EMBODIMENTS

Figure 1:
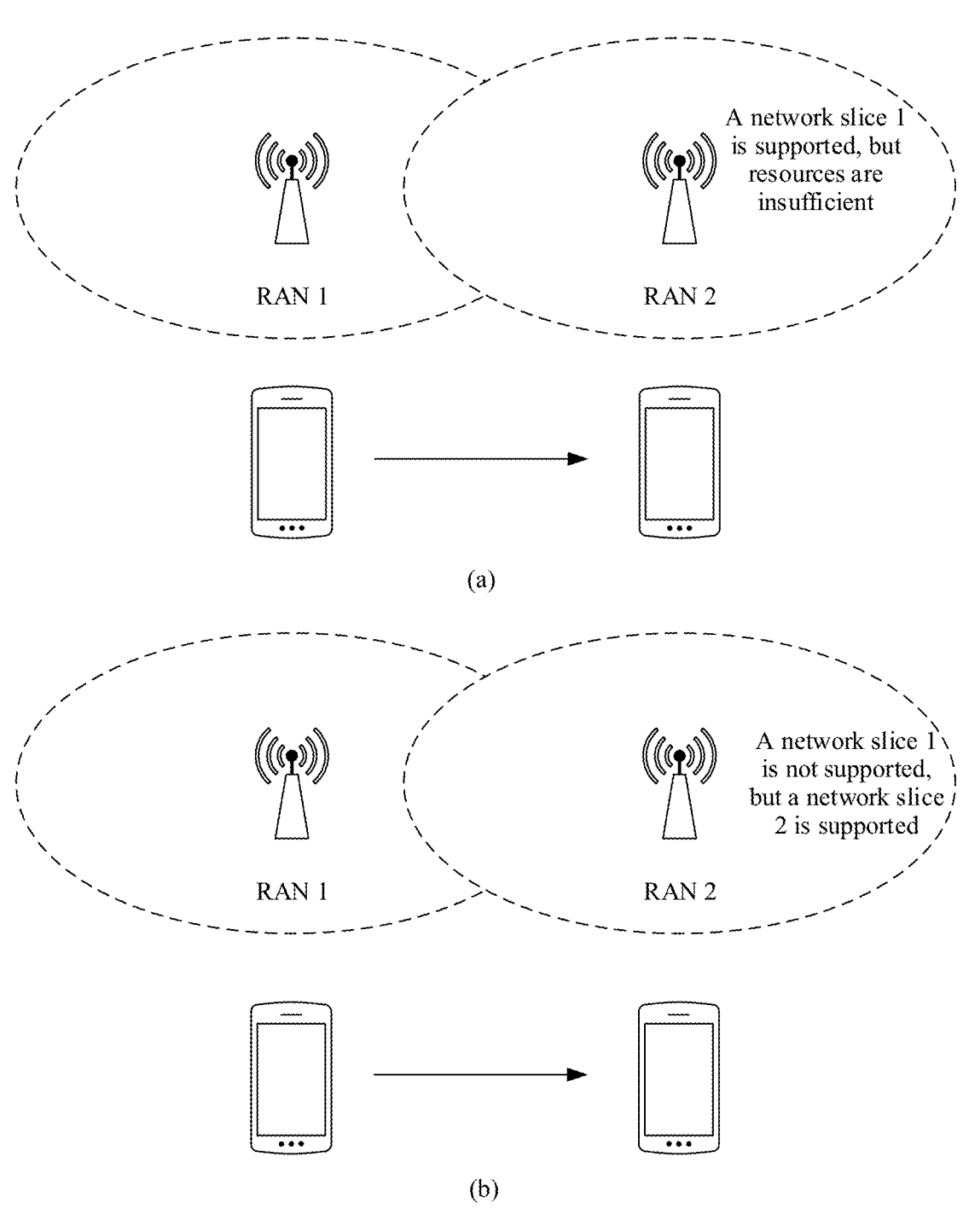
FIG. 1 is a schematic diagram of a handover scenario according to an embodiment of this application.

The following describes technical solutions of this application with reference to accompanying drawings.

The technical solutions in embodiments of this application may be applied to various communication systems, for example, a long term evolution (LTE) system, a 5th generation (5G) system, or a communication system after 5G.

The terminal device in embodiments of this application may refer to user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in another communication system, or the like. This is not limited in this application.

A radio access network device in embodiments of this application may be any device having a wireless transceiver function. The access network device includes but is not limited to an evolved NodeB (eNB), a radio network controller (RNC), a node B (NB), a base station controller (BSC), a base transceiver station (BTS), a home evolved nodeB (or home node B, HNB), a baseband unit (BBU), an access point (AP), a wireless relay node, a wireless backhaul node, a transmission point (TP) or a transmission and reception point (TRP), or the like. Alternatively, the access network device may be a gNB or a transmission point in a 5G system, or a network node, for example, a building baseband unit (BBU) or a distributed unit (DU), that constitutes a gNB or a transmission point.

In addition, for ease of understanding the technical solutions of this application, concepts related to a network slice in embodiments of this application are briefly described.

In a mobile communication technology, requirements of emerging new services and new application scenarios for network functions, connection performance, security, and the like differ greatly. If a single network is used to carry these services, it is difficult to meet requirements for high bandwidth, low latency, high reliability, and the like at the same time. Therefore, in 5G, an end-to-end network slice is used to provide a user with a customized network service. Specifically, through flexible allocation of network resources and on-demand networking, a plurality of logical subnets having different features and isolated from each other may be virtualized on a same set of physical infrastructures, to provide the user with a targeted service.

Different logical subnets are identified and distinguished by using pieces of single network slice selection assistance information (S-NSSAI). Each piece of S-NSSAI may include the following content:

a slice type (SST), used to point to a specific feature and service type of a slice; and a slice differentiator (SD), used as a supplement to the SST, used to further distinguish between a plurality of network slice instances (NSIs) satisfying a same SST, and used as an optional parameter.

Network slice instance means a group of network functions (and resources of the network functions) that can be orchestrated and configured into a complete logical network that meets a specific network requirement, and the network slice instance has a many-to-many mapping relationship with network slice subnet instances (NSSIs).

Network slice subnet instance means a group of network functions (and resources of the network functions) that can be orchestrated and configured into a complete logical subnet that meets a specific network requirement. The network slice subnet instance is an identifier of a group of network function (NF) instances deployed in a network slice. A network slice subnet management function (NSSMF) is to perform topology association on the S-NSSAI and the NF by using the NSSI and manage slice instance resources.

RAN slice instance (RSI) means an actual or virtual resource on a radio access network, and may be a universal identifier or the like. A single RSI may hold one or more network slices. The one or more network slices may belong to a same public land mobile network (PLMN), or may belong to different PLMNs. A single network slice may alternatively correspond to one or more RSIs.

Slice re-mapping may mean that a service that has been mapped to a network slice is remapped to another network slice. For example, "remapping a network slice #1 to a network slice #2" may be understood as that a service of the network slice #1 (or a service mapped to the network slice #1) may be implemented by using the network slice #2, or the service of the network slice #1 is implemented by using a network resource of the network slice #2.

FIG. 1 is a schematic diagram of a handover scenario according to an embodiment of this application.

As shown in (a) in FIG. 1, an access network device currently accessed by a terminal device is a RAN 1, and a network slice associated with a currently performed service is a network slice 1. As the terminal device moves, when quality of a channel between the terminal device and the RAN 1 deteriorates, to ensure quality of service, the RAN 1 searches for a RAN 2 with better channel quality for the terminal device. However, when the RAN 2 supports the network slice 1, but resources of the RAN 2 are insufficient, the service of the terminal device may be interrupted if the terminal device accesses the RAN 2. In this case, the slice re-mapping is generally used to resolve this problem. To be specific, another network slice is used to carry a service currently performed by the terminal device. For example, a network slice 2 is used to carry the service in the network slice 1.

As shown in (b) in FIG. 1, an access network device currently accessed by a terminal device is a RAN 1, and a network slice associated with a currently performed service is a network slice 1. As the terminal device moves, when quality of a channel between the terminal device and the RAN 1 deteriorates, to ensure quality of service, the RAN 1 searches for a RAN 2 with better channel quality for the terminal device. However, when the RAN 2 does not support the network slice 1, but supports the network slice 2, the service of the terminal device may also be interrupted if the terminal device accesses the RAN 2. In this case, the slice re-mapping is generally also used to resolve this problem. To be specific, the service on the network slice 1 is remapped to the network slice 2.

However, network slice re-mapping causes a change of a network slice identifier corresponding to a protocol data unit (PDU) session of the terminal device, and has great impact on a core network. For example, re-charging may exist, or a core network element needs to perform reallocation based on a new network slice.

Figure 2:
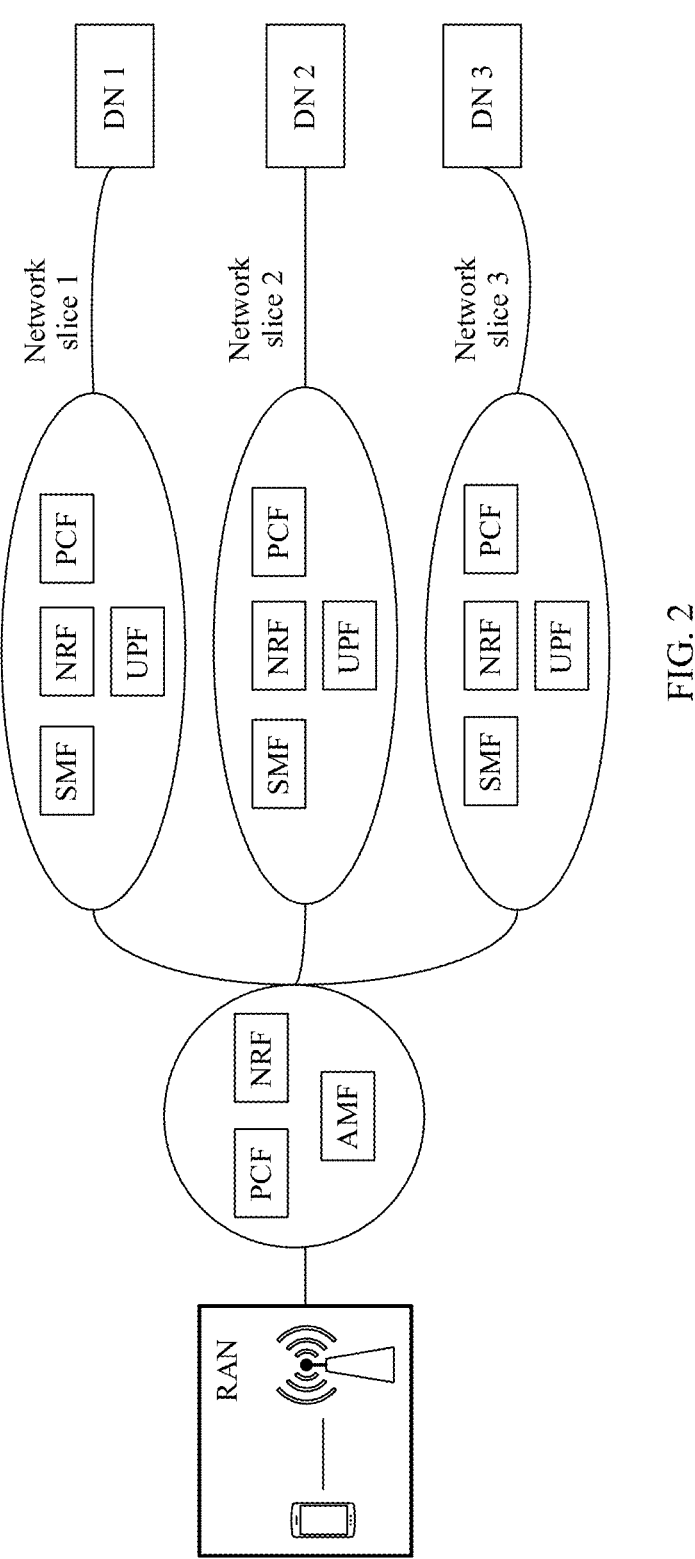
FIG. 2 is a schematic diagram of an architecture of a network slice to which an embodiment of this application is applicable.

FIG. 2 is a schematic diagram of an architecture of a network slice to which an embodiment of this application is applicable. As shown in FIG. 2, for a plurality of deterministic networking (DN) services, in 5G, an end-to-end network slice is used to provide a user with a customized network service. Through flexible allocation of network resources and on-demand networking, a plurality of logical subnets having different features and isolated from each other may be virtualized on a same set of physical devices, to provide the user with a targeted service, so as to meet requirements for high bandwidth, low latency, high reliability, and the like. For example, the DN may be a scenario such as a mobile phone service, live video broadcast, vehicle control, or drone patrol.

As shown in FIG. 2, the core network is divided into three core network slice subnet instances, and these are respectively corresponding to three network slices. A plurality of network slices may alternatively share a same core network slice subnet instance. The core network slice subnet instance may include a plurality of core network elements, for example, a session management function (SMF), a network repository function (NRF), a policy control function (PCF), a user plane function (UPF), and an access and mobility management function (AMF). However, on an access network, network resources on the access network are not defined. In this embodiment of this application, an access network slice instance is defined on the access network, so that when a terminal device performs handover between access network devices, continuity of a network slice service is ensured.

As shown in FIG. 2, when a service on the network slice 1 is remapped to the network slice 2, the core network element may perform reallocation. Therefore, slice re-mapping has great impact on the core network.

Embodiments of this application provide a handover control method and an admission control method, to ensure continuity of a network slice service when a terminal device performs handover, and reduce impact on a core network.

In an embodiment of this application, mapping information between an RSI and a network slice may be preconfigured in an access network device.

For example, in an access network device (for example, a base station), a correspondence between an RSI identifier and an identifier of the network slice may be preconfigured, and the RSI identifier may include an access network device identifier or a cell identifier.

The mapping information may further include one or more PLMN identifiers. Each PLMN may include one or more network slice identifiers, for example, S-NSSAI. Alternatively, each PLMN may include one or more network slice group identifiers.

Specifically, for an RSI subordinate to an access network device, there may be the following cases:

Manner 1:

If an RSI #1 corresponds to a network slice #1 and a network slice #2, the network slice #1 may belong to a PLMN #1, and the network slice may belong to a PLMN #2. Alternatively, if the network slice #1 and the network slice #2 belong to a same PLMN, for example, a PLMN #1, it may indicate that the access network device may support the network slice #1 and the network slice #2.

Manner 2:

If an RSI #1 corresponds to a network slice #1 and a network slice #2, it may indicate that the network slice #1 and the network slice #2 may be implemented by the RSI #1, and there is a remapping relationship between the network slice #1 and the network slice #2. Preemption priorities of the network slice #1 and the network slice #2 for the RSI #1 may be different. In other words, the RSI #1 may be preferentially used by the network slice #1 or the network slice #2.

Manner 3:

If an RSI #1 and an RSI #2 correspond to a network slice #1, it may indicate that the network slice #1 may be implemented by the RSI #1 and the RSI #2. When the RSI #1 is unavailable, a service of the network slice #1 may be implemented by the RSI #2. When the RSI #2 is unavailable, a service of the network slice #1 may be implemented by the RSI #1.

Figure 3:
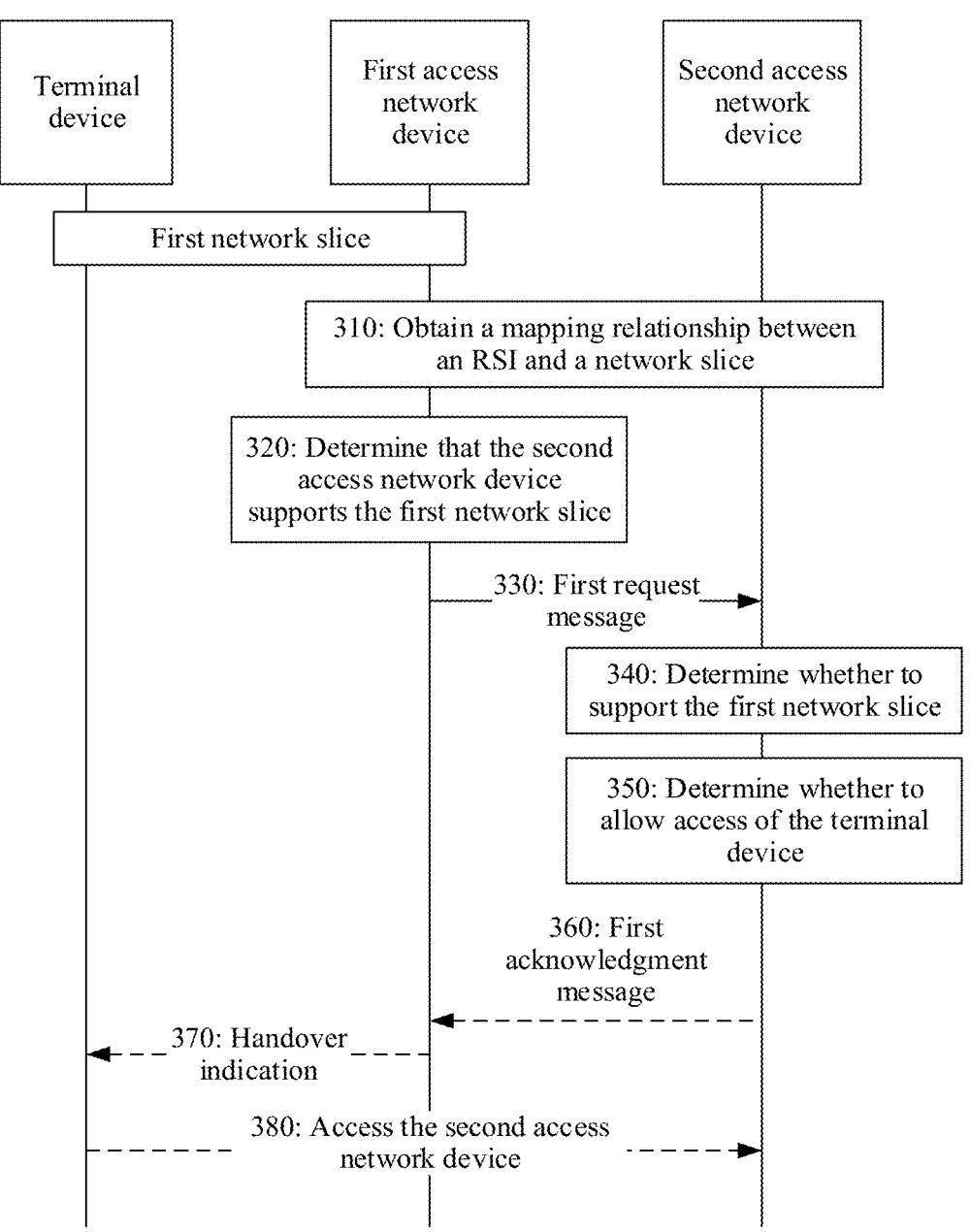
FIG. 3 is a schematic flowchart of a handover control method according to an embodiment of this application.

FIG. 3 is a schematic interaction diagram of a handover control method according to an embodiment of this application. As shown in FIG. 3, the method may include block 310 to block 350.

In an embodiment of this application, a device currently accessed by a terminal device is a first access network device, and a network slice associated with a currently performed service is a first network slice.

At block 310, the first access network device obtains mapping information between an access network slice instance of a second access network device and a network slice.

The mapping information may include a mapping relationship or a correspondence between the access network slice instance and the network slice. One RSI may correspond to a plurality of network slices, or one network slice may correspond to a plurality of RSIs. This is not limited in this embodiment of this application.

The mapping information may further include a preemption priority of the network slice for the access network slice instance. It should be understood that a service corresponding to a network slice with a high preemption priority is preferentially processed.

The mapping information may further include load information of the access network slice instance.

The mapping information may be preconfigured in the second access network device. The mapping information may be preconfigured by a core network element in the second access network device, for example, preconfigured by an operation administration and maintenance (OAM) network element, or preconfigured by another network element. This is not limited in this embodiment of this application.

In an embodiment, the first access network device may obtain the mapping information between the access network slice instance and the network slice from the second access network device through a system interface.

For example, the first access network device may obtain the mapping information through an Xn system interface between base stations.

In another embodiment, the first access network device may send a request message to the second access network device, and the request message is used to request to obtain the mapping information; and the first access network device receives the mapping information sent by the second access network device.

In another embodiment, the second access network device may directly send the mapping information to the first access network device.

At block 320, the first access network device determines, based on the mapping information, that the second access network device supports the first network slice associated with the service currently performed by the terminal device.

In an embodiment, the first access network device may determine, based on the mapping information, that the second access network device includes a first access network slice instance corresponding to the first network slice. Therefore, the first access network device may determine that the second access network device supports the first network slice.

Otherwise, the first access network device continues to search for a target second access network device that meets a condition.

In another embodiment, the mapping information further includes the preemption priority of the network slice for the access network slice instance. When the first access network device determines that a preemption priority of the first network slice for a first access network slice instance of the second access network device is greater than a first preset value, the first access network device determines that the second access network device supports the first network slice.

The first preset value may be a specified fixed value X. When the preemption priority Y of the first network slice for the first access network slice instance is greater than the fixed value X, it may be determined that the second access network device supports the first network slice.

Alternatively, the first preset value may be a non-fixed value. For example, the first preset value may be a preemption priority of current load of the first access network slice instance. When the preemption priority of the first network slice for the first access network slice instance is greater than the preemption priority of the current load of the first access network slice instance, it may be determined that the second access network device supports the first network slice.

The first preset value may alternatively be load of the second access network slice instance. A preemption priority of the first network slice for the second access network slice instance and the load of the second access network slice instance may be different dimensions. For ease of comparison, the two may be normalized or converted into a same dimension by using a specific function. The specific function is not limited in this embodiment of this application.

Otherwise, the first access network device continues to search for a target second access network device that meets a condition.

In still another embodiment, the mapping information further includes the preemption priority of the network slice for the access network slice instance, and that when the first access network device determines that a preemption priority of the first network slice for a first access network slice instance of the second access network device is less than or equal to a first preset value, the first access network device determines that the second access network device supports the first network slice includes: If the first access network device determines that the second access network device includes a second access network slice instance corresponding to the first network slice, and a preemption priority of the first network slice for the second access network slice instance is greater than a second preset value, the first access network device may determine that the second access network device supports the first network slice. Otherwise, the first access network device continues to search for a target second access network device that meets a condition.

The second preset value may be a preemption priority corresponding to load of the second access network slice instance, or may be a specified value.

The second preset value may alternatively be load of the second access network slice instance. A preemption priority of the first network slice for the second access network slice instance and the load of the second access network slice instance may be different dimensions. For ease of comparison, the two may be normalized or converted into a same dimension by using a specific function. The specific function is not limited in this embodiment of this application.

In yet another embodiment, a network slice associated with the service currently performed by the terminal device is a network slice #1, and a preemption priority of the network slice #1 for an RSI #1 is Y In addition, a network slice #2 that the network allows the terminal device to use also corresponds to the RSI #1. In other words, the RSI #1 may hold the network slice #1 and the network slice #2. A preemption priority of the network slice #2 for the RSI #1 is Z, and a preemption priority of current load of the RSI #1 is X. If Z>X>Y, the first access network device determines that the second access network device supports the first network slice associated with the service currently performed by the terminal device, and the first access network device determines that the terminal device can be handed over to the second access network device, and remaps the network slice #1 to the network slice #2.

In another embodiment, a network slice associated with the service currently performed by the terminal device is a network slice #1, both an RSI #1 and an RSI #2 that are subordinate to the second access network device support the network slice #1, a preemption priority of load of the current RSI #1 is X1, a preemption priority of load of the RSI #2 is X2, a preemption priority of the network slice #1 for the RSI #1 is YT, and a preemption priority of the network slice #1 for the RSI #2 is Y2. If Y1<X1, but Y2>X2, the network slice #1 may be held by the RSI #2. In this case, the first access network device determines that the second access network device supports the first network slice associated with the service currently performed by the terminal device, and the first access network device determines that the terminal device can be handed over to the second access network device.

At block 330, the first access network device sends a first request message to the second access network device, and the first request message is used to request to enable the terminal device to access the second access network device.

When determining that the second access network device supports the first network slice associated with the service currently performed by the terminal device, the first access network device sends the first request message to the second access network device, to request to enable the terminal device to access the second access network device.

It should be understood that the first request message may include an identifier of the first network slice associated with the service currently performed by the terminal device, and the identifier may uniquely correspond to the first network slice. For example, the identifier may be S-NSSAI.

In an embodiment, before block 330, the first access network device may obtain the load information of the access network slice instance of the second access network device.

The first access network device determines, based on the load information, that the first access network slice instance corresponding to the first network slice meets a service requirement of the first network slice.

In an embodiment, the load information may be carried in the mapping information between the access network slice instance and the network slice.

In another embodiment, the first access network device may send a request message to the second access network device, to request load information of the first access network slice instance, and receive the load information sent by the second access network device.

At block 340, the second access network device determines, based on the mapping relationship between the access network slice instance and the network slice, whether to support the first network slice.

After the second access network device receives the first request message, because the first message carries the identifier of the first network slice corresponding to the service currently performed by the terminal device, the second access network device may determine, based on the mapping relationship between the RSI and the network slice, whether to support the first network slice.

In an embodiment, the second access network device determines, based on the mapping relationship between the RSI and the network slice, to support the first network slice associated with the service currently performed by the terminal device.

For example, if the second access network device determines, based on the mapping relationship between the RSI and the network slice, that the second access network device includes an RSI corresponding to the first network slice, it may be determined that the second access network device supports the first network slice.

In another embodiment, the second access network device determines, based on the mapping relationship between the RSI and the network slice, not to support the first network slice associated with the service currently performed by the terminal device. In this case, the second access network device may reject access of the terminal device.

For example, if the second access network device determines, based on the mapping relationship between the RSI and the network slice, that the second access network device does not include an RSI corresponding to the first network slice, or determines that the second access network device does not include a first network slice corresponding to the identifier of the first network slice, it may be determined that the second access network device does not support the first network slice.

The mapping relationship between the access network slice instance and the network slice may be preconfigured in the second access network device, for example, may be preconfigured in the second access network device by the OAM network element.

At block 350, if the second access network device supports the first network slice, the second access network device determines, based on the load information of the first access network slice instance corresponding to the first network slice, whether to allow access of the terminal device.

At block 340, if the second access network device determines to support the first network slice, the second access network device further needs to determine, based on the load information of the first access network slice instance corresponding to the first network slice, whether to allow access of the terminal device.

In an embodiment, the second access network device allows, based on the load information of the first access network slice instance corresponding to the first network slice, the access of the terminal device.

For example, if an access network slice instance corresponding to the first network slice is the first access network slice instance, and load corresponding to the first access network slice instance can meet the service requirement of the first network slice, the access of the terminal device is allowed.

In another embodiment, the second access network device rejects, based on the load information of the first access network slice instance corresponding to the first network slice, the access of the terminal device.

For example, if an access network slice instance corresponding to the first network slice is the first access network slice instance, and load corresponding to the first access network slice instance cannot meet the service requirement of the first network slice, the access of the terminal device is rejected.

In still another embodiment, if the second access network device determines, based on the load information of the first access network slice instance, that the preemption priority of the first network slice for the first access network slice instance is greater than a third preset value, the second access network device allows the access of the terminal device.

The third preset value may be a specified fixed value X. When the preemption priority Y of the first network slice for the first access network slice instance is greater than the fixed value X, the second access network device allows the access of the terminal device.

Alternatively, the third preset value may be a non-fixed value. For example, the third preset value may be the preemption priority of current load of the first access network slice instance. When the preemption priority of the first network slice for the first access network slice instance is greater than the preemption priority of the current load of the first access network slice instance, the second access network device allows the access of the terminal device.

The third preset value may alternatively be load of the first access network slice instance. A preemption priority of the first network slice for the first access network slice instance and the load of the first access network slice instance may be different dimensions. For ease of comparison, the two may be normalized or converted into a same dimension by using a specific function. The specific function is not limited in this embodiment of this application.

In yet another embodiment, if the second access network device determines, based on the load information of the first access network slice instance, that the preemption priority of the first network slice for the first access network slice instance is less than or equal to a third preset value, the second access network device rejects the access of the terminal device.

In still yet another embodiment, if the preemption priority of the first network slice for the first access network slice instance is less than or equal to a third preset value, but the second access network slice instance also corresponds to the first network slice, and the preemption priority of the first network slice for the second access network slice instance is greater than a fourth preset value, the access of the terminal device is allowed.

It should be understood that the fourth preset value may be a fixed value, or may be the preemption priority corresponding to the load of the second access network slice instance.

The fourth preset value may alternatively be the load of the second access network slice instance. The preemption priority of the first network slice for the second access network slice instance and the load of the second access network slice instance may be different dimensions. For ease of comparison, the two may be normalized or converted into a same dimension by using a specific function. The specific function is not limited in this embodiment of this application.

According to an embodiment of this application, the first access network device obtains the mapping information between the access network slice instance and the network slice, and determines, based on the mapping information, that the second access network device supports the first network slice associated with the service currently performed by the terminal device. In this case, the first access network device sends the request message to the second access network device, to request to enable the terminal device to access the second access network device.

According to an embodiment of this application, when receiving the request message of the first access network device, the second access network device determines, based on the mapping information between the access network slice instance of the second access network device and the network slice, whether to support the first network slice associated with the service currently performed by the terminal device, and determines, based on the load information of the access network slice instance, whether to allow access of the terminal device.

In this technical solution, handover control may be performed, based on whether the access network device supports the network slice, on the access network device accessed by the terminal device, so that continuity of the network slice service can be ensured when the terminal device performs handover, and impact on the core network can be reduced.

Optionally, the method may further include block 360 to block 380.

At block 360, the second access network device sends a first acknowledgment message to the first access network device.

After determining that the second access network device supports the first network slice, the second access network device may send the first acknowledgment message to the first access network device.

Alternatively, after determining that the second access network device supports the first network slice, the second access network device performs related handover preparation work, and after completing the handover preparation work, sends the first acknowledgment message to the first access network device, to notify the first access network device that the second access network device is ready for handover.

At block 370, the first access network device sends handover indication information to the terminal device.

The handover indication information may include related information of the second access network device, such as a device identifier and a slice identifier.

At block 380, the terminal device accesses the second access network device.

For example, this access process may be a random access process.

Figure 4:
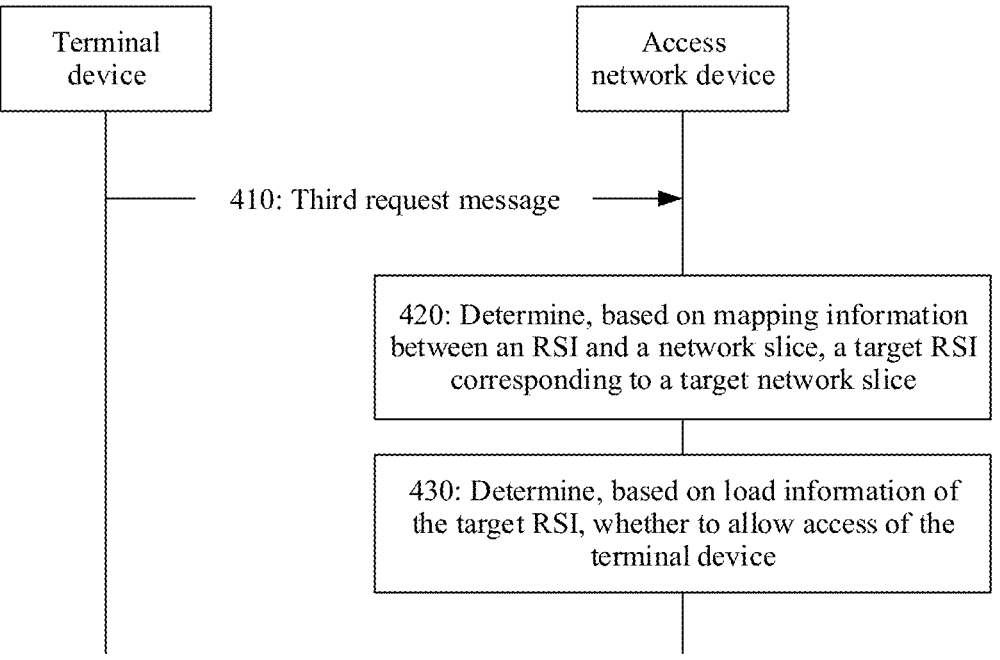
FIG. 4 is a schematic flowchart of an admission control method according to an embodiment of this application.

FIG. 4 is a schematic flowchart of an admission control method according to an embodiment of this application. As shown in FIG. 4, the method may include block 410 to block 430.

At block 410, a terminal device sends a third request message to an access network device.

The third request message is used by the terminal device to request to access the access network device, and the third request message includes identification information of a target network slice that the terminal device expects to access.

For example, the identification information may be an identifier of the target network slice. In an initial admission control phase, the terminal device sends an access request message to the access network device, and the request message may carry the identifier, for example, S-NSSAI, of the target network slice that the terminal device expects to access. The identification information may alternatively be other information that can identify a network slice, or the like.

At block 420, the access network device determines, based on mapping information between an access network slice instance and a network slice, a target access network slice instance corresponding to the target network slice.

For example, the access network device may determine, based on the mapping information between the access network slice instance and the network slice, that the identifier of the target network slice exists, and determine the target access network slice instance based on a network slice corresponding to the identifier of the target network slice.

The mapping information between the RSI and the network slice may be preconfigured in the access network device, for example, may be preconfigured in a second access network device by a core network element.

For example, the mapping information may be preconfigured in the second access network device by an OAM network element.

At block 430, the access network device determines, based on load information of the target access network slice instance, whether to allow access of the terminal device.

In an example, if it is determined, based on the load information of the target access network slice instance, that load of the target access network slice instance cannot meet a service requirement of the target network slice, the access of the terminal device may be rejected.

In another example, if it is determined, based on the load information of the target access network slice instance, that load of the target access network slice instance can meet a service requirement of the target network slice, the access of the terminal device may be allowed.

In another example, the load information may further include a preemption priority of the target network slice. If the access network device may further determine, based on the load information of the target access network slice instance, that the preemption priority of the target network slice is greater than a preset value, the access of the terminal device may be allowed.

According to this embodiment of this application, the terminal device carries the identification information of the target network slice in the access request message, and the access network device may determine, based on the mapping information between the access network slice instance and the network slice, the access network slice instance corresponding to the target network slice, and determine, based on the load information of the access network slice instance, whether to allow access of the terminal device. This technical solution can improve admission control efficiency.

Figures 5, 6:
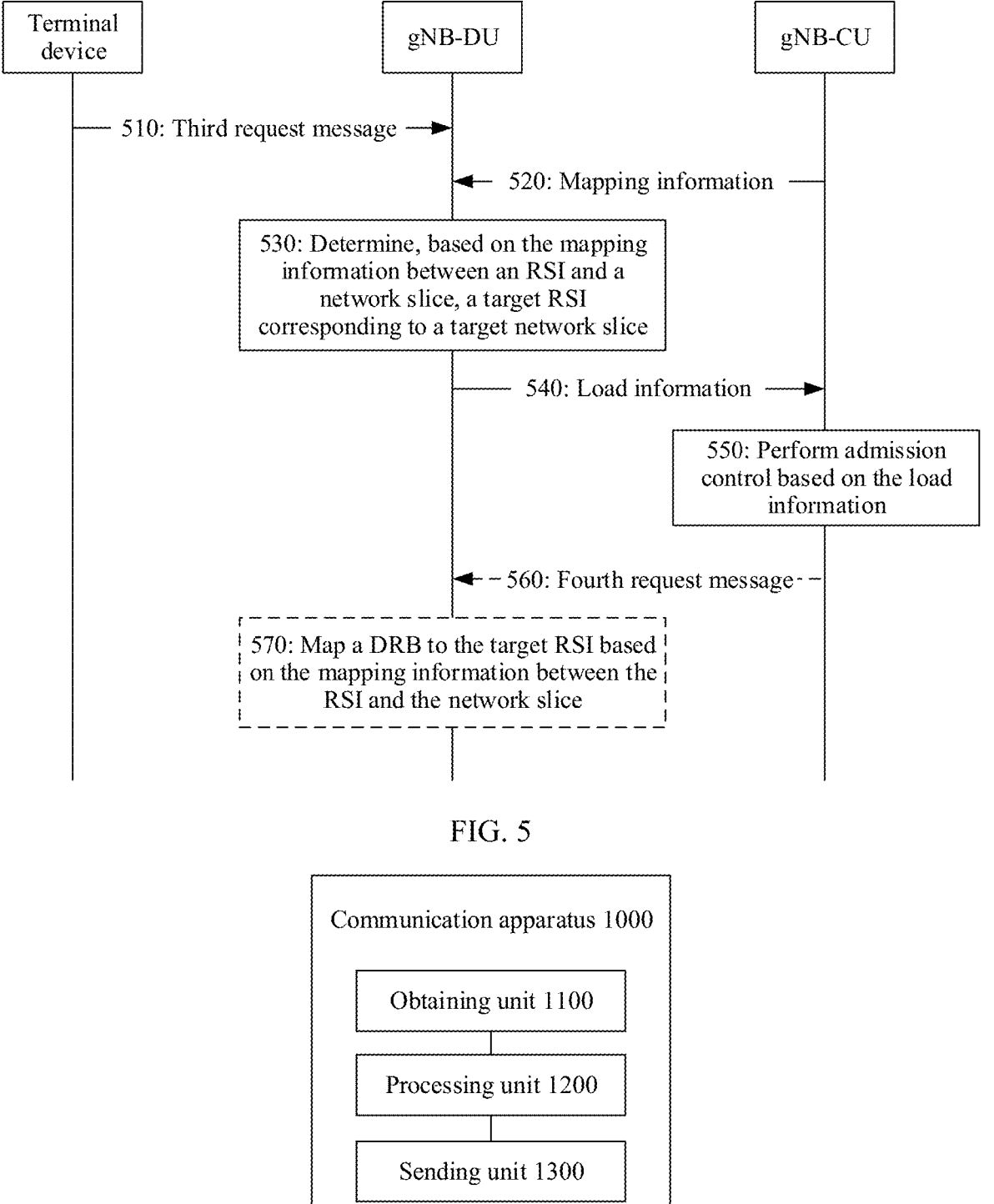
FIG. 5 is a schematic flowchart of another admission control method according to an embodiment of this application.
FIG. 6 is a schematic block diagram of a communication apparatus according to an embodiment of this application.

FIG. 5 is a schematic flowchart of an admission control method according to an embodiment of this application. As shown in FIG. 5, the method may include block 510 to block 550. In this embodiment of this application, an example in which the access network device is a gNB is used for description. The gNB may include a distributed unit (DU) and a central unit (CU).

At block 510, a terminal device sends a third request message to the DU.

The third request message is used by the terminal device to request to access an access network device, and the third request message includes identification information of a target network slice that the terminal device expects to access.

For example, the identification information may be an identifier of the target network slice. In an initial admission control phase, the terminal device sends an access request message to the DU of the access network device, and the request message may carry the identifier, for example, S-NSSAI, of the target network slice that the terminal device expects to access. The identification information may alternatively be other information that can identify a network slice, or the like.

At block 520, the CU sends mapping information between an access network slice instance and a network slice to the DU.

In an example, if the mapping information is preconfigured in the CU, the CU may send the mapping information to the DU. For example, the CU may send the mapping information in response to a request of the DU, or may actively send the mapping information. This is not limited in this embodiment of this application.

In an embodiment, the CU does not need to send the mapping information between the access network slice instance and the network slice to the DU, and the mapping information may be preconfigured in the DU.

It should be understood that a sequence of the block 510 and the block 520 is not limited in this embodiment of this application. For example, the block 520 may alternatively be performed before the block 510.

At block 530, the DU determines, based on the mapping information between the access network slice instance and the network slice, a target access network slice instance corresponding to the target network slice.

For example, the DU may determine, based on the mapping information, that the identifier of the target network slice exists, and determine the target access network slice instance based on a network slice corresponding to the identifier of the target network slice.

Optionally, the DU may perform admission control on the terminal device based on load information of the target access network slice instance.

For example, the DU may determine, based on a current load state, that load of the DU can meet a service requirement of the terminal device, and then allow access of the terminal device. Alternatively, the DU may determine, based on a current load state, that load of the DU cannot meet a service requirement of the terminal device, and then reject access of the terminal device. Alternatively, the DU may further allow access of the terminal device if a preemption priority of the target network slice for the target access network slice instance is greater than a preset value.

At block 540, the DU sends load information of the access network slice instance to the CU.

In an example, the DU may send the load information of the target access network slice instance to the CU, to assist the CU in further admission control on the terminal device.

In another example, the DU may send load information of a plurality of access network slice instances to the CU, and the plurality of access network slice instances include the target access network slice instance.

At block 550, the CU performs admission control based on the load information.

For example, the CU may determine, based on the current load state, that the load of the CU can meet the service requirement of the terminal device, and then allow access of the terminal device. Alternatively, the CU may determine, based on the current load state, that the load of the CU cannot meet the service requirement of the terminal device, and then reject access of the terminal device. Alternatively, the CU may further allow access of the terminal device if the preemption priority of the target network slice for the target access network slice instance is greater than the preset value.

Optionally, the method may further include block 560 and block 570.

At block 560, the CU sends a fourth request message to the DU, and the fourth request message is used to request to set up a context of the terminal device.

The fourth request message may include a network slice identifier corresponding to a data radio bearer (DRB).

At block 570, the DU maps, based on the mapping information between the access network slice instance and the network slice, the DRB to the target access network slice instance corresponding to the target network slice.

According to an embodiment of this application, the terminal device sends the request message to the DU, and the DU determines the target access network slice instance based on the mapping information between the access network slice instance and the network slice, and sends the load information of the target access network slice instance to the CU, so that the CU can perform admission control on the terminal device based on the load information. This technical solution can improve quality of service and efficiency of the network slice.

FIG. 6 is a schematic block diagram of a communication apparatus according to an embodiment of this application. As shown in FIG. 6, the communication apparatus 1000 may include an obtaining unit 1100, a processing unit 1200, and a sending unit 1300.

The obtaining unit 1100 is configured to obtain mapping information between an access network slice instance of a second access network device and a network slice.

The processing unit 1200 is configured to determine, based on the mapping information, that the second access network device supports a first network slice associated with a service currently performed by a terminal device.

The sending unit 1300 is configured to send first request information to the second access network device, and the first request information is used to request to enable the terminal device to access the second access network device.

In an embodiment, the obtaining unit 1100 and the sending unit 1300 may be integrated into one unit. This is not limited.

In an embodiment, the processing unit 1200 is configured to: when determining, based on the mapping information, that the second access network device includes a first access network slice instance corresponding to the first network slice, determine that the second access network device supports the first network slice.

In an embodiment, the processing unit 1200 is further configured to obtain load information of the access network slice instance of the second access network device; and the processing unit is further configured to determine, based on the load information, that the first access network slice instance corresponding to the first network slice meets a service requirement of the first network slice.

In an embodiment, the mapping information further includes a preemption priority of the network slice for the access network slice instance, and the processing unit 1200 is configured to: when determining that a preemption priority of the first network slice for the first access network slice instance of the second access network device is greater than a first preset value, determine that the second access network device supports the first network slice.

In an embodiment, the mapping information further includes a preemption priority of the network slice for the access network slice instance, a preemption priority of the first network slice for the first access network slice instance of the second access network device is less than or equal to a first preset value, and the processing unit 1200 is configured to: when determining that the second access network device includes a second access network slice instance corresponding to the first network slice, and a preemption priority of the first network slice for the second access network slice instance is greater than a second preset value, determine that the second access network device supports the first network slice.

In an embodiment, the obtaining unit 1100 is configured to obtain the mapping information through a system interface.

In an embodiment, the obtaining unit 1100 is configured to: send a second request message to the second access network device, where the second request message is used to request to obtain the mapping information; and receive the mapping information sent by the second access network device.

In an embodiment, the mapping information is preconfigured in the second access network device.

Figure 7:
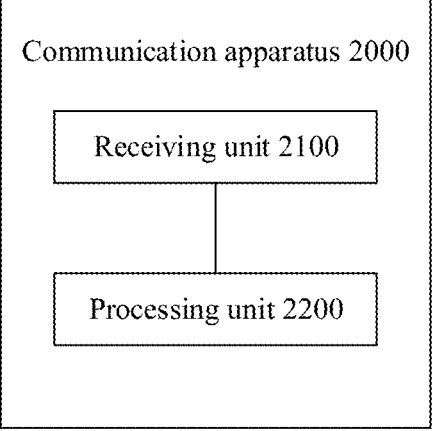
FIG. 7 is a schematic block diagram of a communication apparatus according to an embodiment of this application.

FIG. 7 is a schematic block diagram of a communication apparatus according to an embodiment of this application. As shown in FIG. 7, the communication apparatus 2000 may include a receiving unit 2100 and a processing unit 2200.

The receiving unit 2100 is configured to receive a first request message, the first request information is used to request to enable a terminal device to access a second access network device, and the first request message includes an identifier of a first network slice associated with a service currently performed by the terminal device.

The processing unit 2200 is configured to determine, based on mapping information between an access network slice instance and a network slice, whether to support the first network slice.

The processing unit 2200 is further configured to: if the processing unit determines to support the first network slice, determine, based on load information of a first access network slice instance corresponding to the first network slice, whether to allow access of the terminal device.

In an embodiment, the processing unit 2200 is configured to: determine, based on the load information of the first access network slice instance, that load of the first access network slice instance meets a service requirement of the first network slice; and allow the access of the terminal device.

In an embodiment, the processing unit 2200 is configured to: determine, based on the load information of the first access network slice instance, that load of the first access network slice instance does not meet a service requirement of the first network slice; and reject the access of the terminal device.

In an embodiment, the processing unit 2200 is configured to: determine, based on the load information of the first access network slice instance, that a preemption priority of the first network slice for the first access network slice instance is greater than a third preset value; and allow the access of the terminal device.

In an embodiment, the processing unit 2200 is configured to: determine, based on the load information of the first access network slice instance, that a preemption priority of the first network slice for the first access network slice instance is less than or equal to a third preset value; and reject the access of the terminal device.

In an embodiment, the processing unit 2200 is further configured to: if the processing unit determines, based on the mapping information, not to support the first network slice, reject the access of the terminal device.

In an embodiment, the mapping information between the access network slice instance and the network slice is preconfigured in the second access network device.

Figure 8:
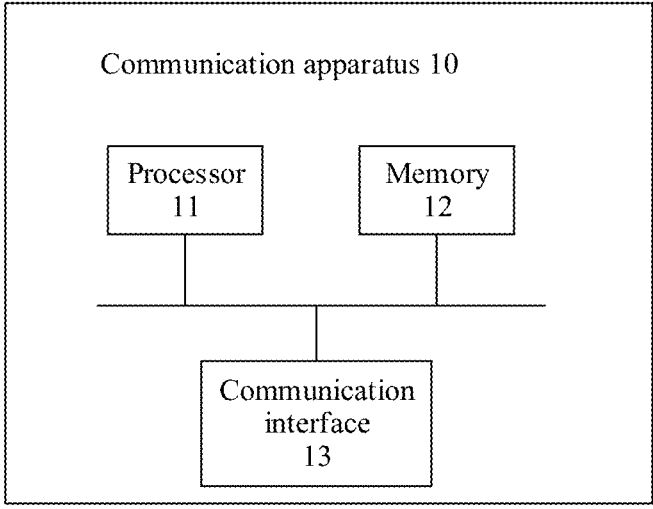
FIG. 8 is a schematic diagram of a structure of a communication apparatus according to an embodiment of this application.

An embodiment of this application further provides a communication apparatus 10. As shown in FIG. 8, the communication apparatus may include one or more processors 11, one or more memories 12, and one or more communication interfaces 13. The processor 11 is configured to control the communication interface 13 to receive/ send a signal, the memory 12 is configured to store a computer program, and the processor 11 is configured to: invoke the computer program from the memory 12 and run the computer program, so that a procedure and/or an operation performed by the first access network device in the method embodiments of this application are/is performed.

For example, the processor 11 may have a function of the processing unit 1200 shown in FIG. 6, and the communication interface 13 may have a function of the sending unit 1300 and/or the obtaining unit 1100 shown in FIG. 6. Specifically, the processor 11 may be configured to perform processing or operations internally performed by the first access network device in FIG. 3 to FIG. 5, and the communication interface 13 is configured to perform sending actions and/or receiving actions performed by the first access network device in FIG. 3 to FIG. 5. Details are not described again.

Figure 9:
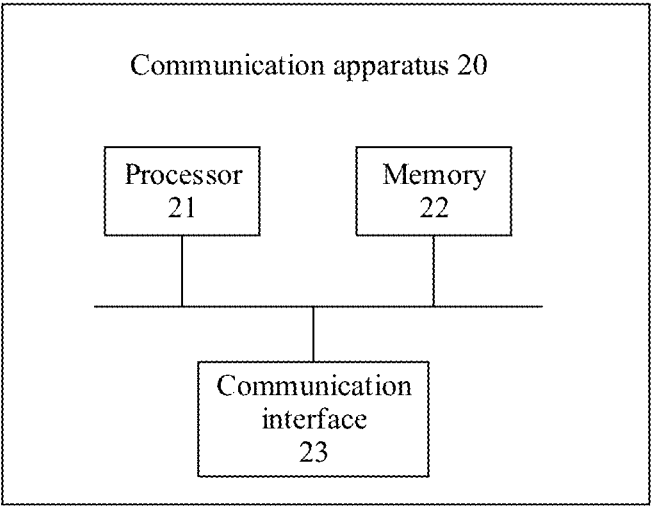
FIG. 9 is a schematic diagram of a structure of a communication apparatus according to an embodiment of this application.

An embodiment of this application further provides a communication apparatus 20. As shown in FIG. 9, the communication apparatus may include one or more processors 21, one or more memories 22, and one or more communication interfaces 23. The processor 21 is configured to control the communication interface 23 to receive/ send a signal, the memory 22 is configured to store a computer program, and the processor 21 is configured to: invoke the computer program from the memory 22 and run the computer program, so that a procedure and/or an operation performed by the second access network device in the method embodiments of this application are/is performed.

For example, the processor 21 may have a function of the processing unit 2200 shown in FIG. 7, and the communication interface 23 may have a function of the receiving unit 2100 shown in FIG. 7. Specifically, the processor 21 may be configured to perform processing or operations internally performed by the second access network device in FIG. 3 to FIG. 5, and the communication interface 23 is configured to perform sending actions and/or receiving actions performed by the second access network device in FIG. 3 to FIG. 5. Details are not described again.

An embodiment of this application further provides a communication apparatus. The communication apparatus includes: a receiving unit, configured to receive a third request message of a terminal device, where the third request message is used by the terminal device to request to access the access network device, and the third request message includes an identifier of a target network slice accessed by the terminal device; and a processing unit, configured to determine, based on mapping information between an access network slice instance and a network slice, a target access network slice instance corresponding to the target network slice. The processing unit is further configured to determine, based on load information of the target access network slice instance, whether to allow access of the terminal device.

An embodiment of this application further provides a communication apparatus, including a processor, a memory, and a transceiver. The memory is configured to store a computer program. The processor is configured to: invoke and run the computer program stored in the memory, and control the transceiver to receive/send a signal, so that the communication apparatus performs the handover control or admission control method according to any one of the foregoing descriptions.

In an embodiment, the memory and the memory in the foregoing apparatus embodiments may be physically independent units, or the memory may be integrated with the processor. This is not limited in this specification.

In addition, this application further provides a computer-readable storage medium. The computer-readable storage medium stores computer instructions. When the computer instructions are run on a computer, an operation and/or a procedure performed by the first access network device in the method embodiments of this application are/is performed.

In addition, this application further provides a computer-readable storage medium. The computer-readable storage medium stores computer instructions. When the computer instructions are run on a computer, an operation and/or a procedure performed by the second access network device in the method embodiments of this application are/is performed.

This application further provides a computer program product. The computer program product includes computer program code or instructions. When the computer program code or the instructions is/are run on a computer, an operation and/or a procedure performed by the first access network device in the method embodiments of this application are/is performed.

This application further provides a computer program product. The computer program product includes computer program code or instructions. When the computer program code or the instructions is/are run on a computer, an operation and/or a procedure performed by the second access network device in the method embodiments of this application are/is performed.

This application further provides a chip, and the chip includes a processor. A memory configured to store a computer program is disposed independent of the chip. The processor is configured to execute the computer program stored in the memory, to perform an operation and/or processing performed by the first access network device in any method embodiment.

Further, the chip may include a communication interface. The communication interface may be an input/output interface, an interface circuit, or the like. Further, the chip may include the memory.

This application further provides a chip, and the chip includes a processor. A memory configured to store a computer program is disposed independent of the chip. The processor is configured to execute the computer program stored in the memory, to perform an operation and/or processing performed by the second access network device in any method embodiment.

Further, the chip may include a communication interface. The communication interface may be an input/output interface, an interface circuit, or the like. Further, the chip may include the memory.

A processor in embodiments of this application may be an integrated circuit chip, and has a signal processing capability. In an implementation process, operations in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The operations of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

A memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, RAMs in many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory of the systems and methods described in this specification includes but is not limited to these and any memory of another proper type.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A handover control method, comprising:
obtaining, by a first access network device, mapping information between an access network slice instance of a second access network device and a network slice;
determining, by the first access network device based on the mapping information, that the second access network device supports a first network slice associated with a service currently performed by a terminal device; and
sending, by the first access network device, first request information to the second access network device, wherein the first request information is used to request to enable the terminal device to access the second access network device, wherein the first request information comprises an identifier of the first network slice.

2. The method according to claim 1, wherein determining that the second access network device supports a first network slice associated with a service currently performed by a terminal device comprises:
determining, by the first access network device based on the mapping information, that the second access network device comprises a first access network slice instance corresponding to the first network slice; and
determining, by the first access network device, that the second access network device supports the first network slice.

3. The method according to claim 1, wherein before sending the first request information to the second access network device, the method further comprises:
obtaining, by the first access network device, load information of the access network slice instance of the second access network device; and
determining, by the first access network device based on the load information, that a first access network slice instance corresponding to the first network slice satisfies a service requirement of the first network slice.

4. The method according to claim 2, wherein the mapping information further comprises a preemption priority of the network slice for the access network slice instance, and determining that the second access network device supports the first network slice comprises:
determining, by the first access network device, that a preemption priority of the first network slice for the first access network slice instance of the second access network device is greater than a first preset value; and
determining, by the first access network device, that the second access network device supports the first network slice.

5. The method according to claim 2, wherein the mapping information further comprises a preemption priority of the network slice for the access network slice instance, a preemption priority of the first network slice for the first access network slice instance of the second access network device is less than or equal to a first preset value, and determining that the second access network device supports the first network slice comprises:

determining, by the first access network device, that the second access network device comprises a second access network slice instance corresponding to the first network slice, wherein a preemption priority of the first network slice for the second access network slice instance is greater than a second preset value; and determining, by the first access network device, that the second access network device supports the first network slice.

6. The method according to claim 1, wherein the mapping information is obtained through a system interface.

7. The method according to claim 1, wherein obtaining the mapping information between an access network slice instance of a second access network device and a network slice comprises:

sending, by the first access network device, a second request message to the second access network device, wherein the second request message is used to request to obtain the mapping information; and receiving the mapping information sent by the second access network device.

8. The method according to claim 1, wherein the mapping information is preconfigured in the second access network device.

9. An admission control method, comprising:

receiving, by a second access network device, a first request message, wherein the first request message is used to request to enable a terminal device to access the second access network device, and the first request message comprises an identifier of a first network slice associated with a service currently performed by the terminal device;

determining, by the second access network device based on mapping information between an access network slice instance and a network slice, whether to support the first network slice; and if the second access network device determines to support the first network slice, determining, by the second access network device based on load information of a first access network slice instance corresponding to the first network slice, whether to allow access of the terminal device.

10. The method according to claim 9, wherein determining whether to allow access of the terminal device comprises:

determining, by the second access network device based on the load information of the first access network slice instance, that load of the first access network slice instance satisfies a service requirement of the first network slice; and allowing, by the second access network device, the access of the terminal device.

11. The method according to claim 9, wherein determining whether to allow access of the terminal device comprises:

determining, by the second access network device based on the load information of the first access network slice instance, that load of the first access network slice instance does not satisfy a service requirement of the first network slice; and

rejecting, by the second access network device, the access of the terminal device.

12. The method according to claim 9, wherein determining whether to allow access of the terminal device comprises:

determining, by the second access network device based on the load information of the first access network slice instance, that a preemption priority of the first network slice for the first access network slice instance is greater than a third preset value; and allowing, by the second access network device, the access of the terminal device.

13. The method according to claim 9, wherein determining whether to allow access of the terminal device comprises:

determining, by the second access network device based on the load information of the first access network slice instance, that a preemption priority of the first network slice for the first access network slice instance is less than or equal to a third preset value; and rejecting, by the second access network device, the access of the terminal device.

14. The method according to claim 9, further comprising:

if the second access network device determines, based on the mapping information, not to support the first network slice, rejecting, by the second access network device, the access of the terminal device.

15. The method according to claim 9, wherein the mapping information between the access network slice instance and the network slice is preconfigured in the second access network device.

16. A communication apparatus, comprising a processor and an interface circuit configured to receive computer code or instructions, and transmit the computer code or the instructions to the processor to instruct the processor to perform a method of claim 1.

17. A communication apparatus, comprising a processor and an interface circuit configured to receive computer code or instructions, and transmit the computer code or the instructions to the processor to instruct the processor to perform a method of claim 9.

18. A non-transitory computer-readable storage medium storing computer instructions, which when run on a computer, cause the computer to perform a method, the method comprising:

obtaining mapping information between an access network slice instance of a second access network device and a network slice;

determining, based on the mapping information, that the second access network device supports a first network slice associated with a service currently performed by a terminal device; and sending first request information to the second access network device, wherein the first request information is used to request to enable the terminal device to access the second access network device, wherein the first request information comprises an identifier of the first network slice.

19. The computer-readable storage medium according to claim 18, wherein determining that the second access network device supports a first network slice associated with a service currently performed by a terminal device comprises:

determining, based on the mapping information, that the second access network device comprises a first access network slice instance corresponding to the first network slice; and determining that the second access network device supports the first network slice.

20. The computer-readable storage medium according to claim 18, wherein before sending the first request information to the second access network device, the method further comprises:

obtaining load information of the access network slice instance of the second access network device; and determining, based on the load information, that a first access network slice instance corresponding to the first network slice satisfies a service requirement of the first network slice.

\* \* \* \* \*